Dec. 17, 1929.  G. M. SIMMONS  1,740,044
PARACHUTE
Filed Jan. 25, 1928
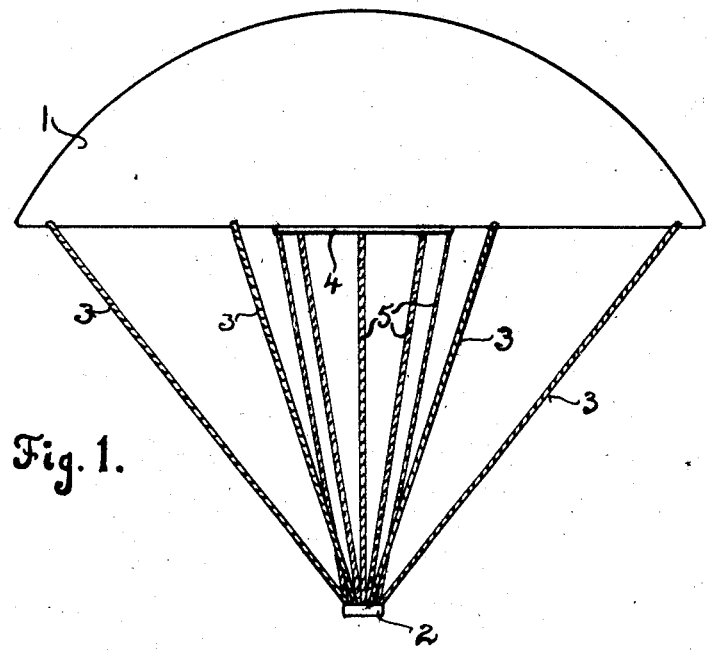
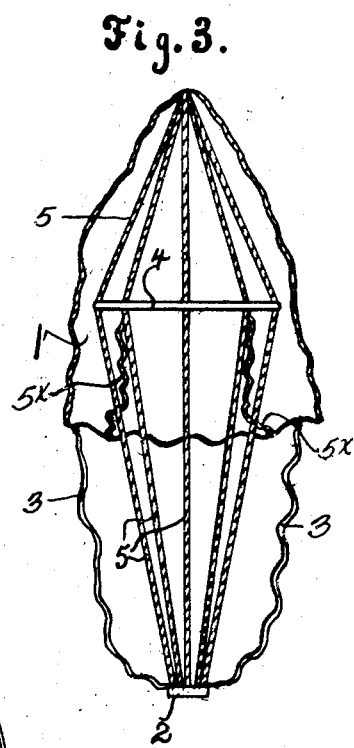
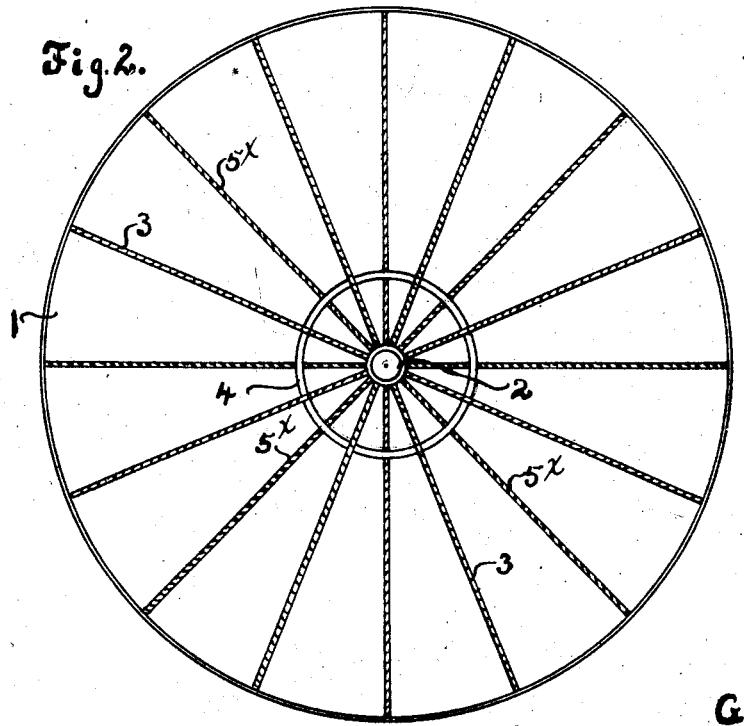
INVENTOR.
George M. Simmons
BY
F. L. Peyton, Jr.
ATTORNEY.

Patented Dec. 17, 1929

1,740,044

UNITED STATES PATENT OFFICE

GEORGE M. SIMMONS, OF COHAY, MISSISSIPPI

PARACHUTE

Application filed January 25, 1928. Serial No. 249,413.

This invention relates to improvements in parachutes as generally used upon aircraft generally, and is designed to provide a parachute simple in structure and to assure opening when launched into the air. The mechanism is of light and durable structure, not cumbersome or difficult to handle, and adapted for a wide general use.

Figure 1 is a side elevation of the invention the canopy or body of the parachute being fully opened out.

Figure 2 is a transverse view of the same.

Figure 3 is a vertical longitudinal view of the inner suspending members with a portion of the parachute canopy broken away.

The canopy or body 1 of ordinary structure has suspended from it by cords 3—3 the suspension member 2.

Disposed on an equilateral plane with the rim of the canopy 1 is the hoop 4, which hoop 4 is so suspended by the cords 5—5.

The cords 5—5 extend from the suspension member 2—2 to the apex of the canopy 1, equivalently disposed about the hoop 4 and appropriately affixed thereto.

Cords 5ˣ—5ˣ are disposed in relation to each other about hook 4 in corresponding relation to the cords 5 and extend from the hoop 4 in pre-disposed relation, to the rim of the canopy 1.

In use, the suspending member 2 is properly affixed to the aviator's body. The canopy is folded over and above the hoop 4. Upon launching of the parachute the pressure of the air against the canopy thru the hoop 4 will begin to open the same. The hoop 4 produces a funnel opening thru which the air may be admitted. Simultaneous with the air pressure and the pull of weight on the suspending member 2 there is a pull downward on the apex of the canopy by the cords 5—5.

It will thus be seen that while the apex of the canopy is pulled downward the flare of the canopy edge is outward; that simultaneous with this action there is produced a conical elongated skeleton frame by the cords 5—5 about the hoop 4, which tends to throw out the canopy of the parachute and make it accessible to the air's entrance. The cords 5ˣ—5ˣ retain the rim of the canopy 1 in a pre-determined sphere with relation to the hoop 4, thereby preventing the canopy 1 from telescoping when it is attempted to be opened out. It is apparent, therefore, that an opening of the parachute is assured and that a safe descent may be made to the ground.

Having thus described my invention, what I claim is:

1. A parachute comprising a parachute body, a suspension member connected to the canopy edge of the parachute by cords, and interdisposed betwixt the suspension member and apex of the body a rigid hoop suspended from the apex of the canopy to the suspension member by a series of cords, said hoop suspended in the same plane with the canopy rim when the parachute is fully opened, and said hoop being tied with the body rim by cords of equal length.

2. In a parachute the combination with the canopy supporting a suspension member, of a hoop interdisposed between the suspension member and the apex of the canopy, the suspension of the hoop being disposed within the canopy when said canopy is in a collapsed state, and cords in pre-disposed relation one to the other about the hoop and extending to the rim of the canopy, said cords in coaction with the hoop adapted to retain the canopy in pre-disposed relationship with the hoop.

In testimony whereof I hereunto affix my signature.

GEORGE M. SIMMONS.